Aug. 31, 1937.  E. ROTTNER  2,091,884
METHOD AND APPARATUS FOR DEFROSTING REFRIGERATORS
Filed Oct. 14, 1935
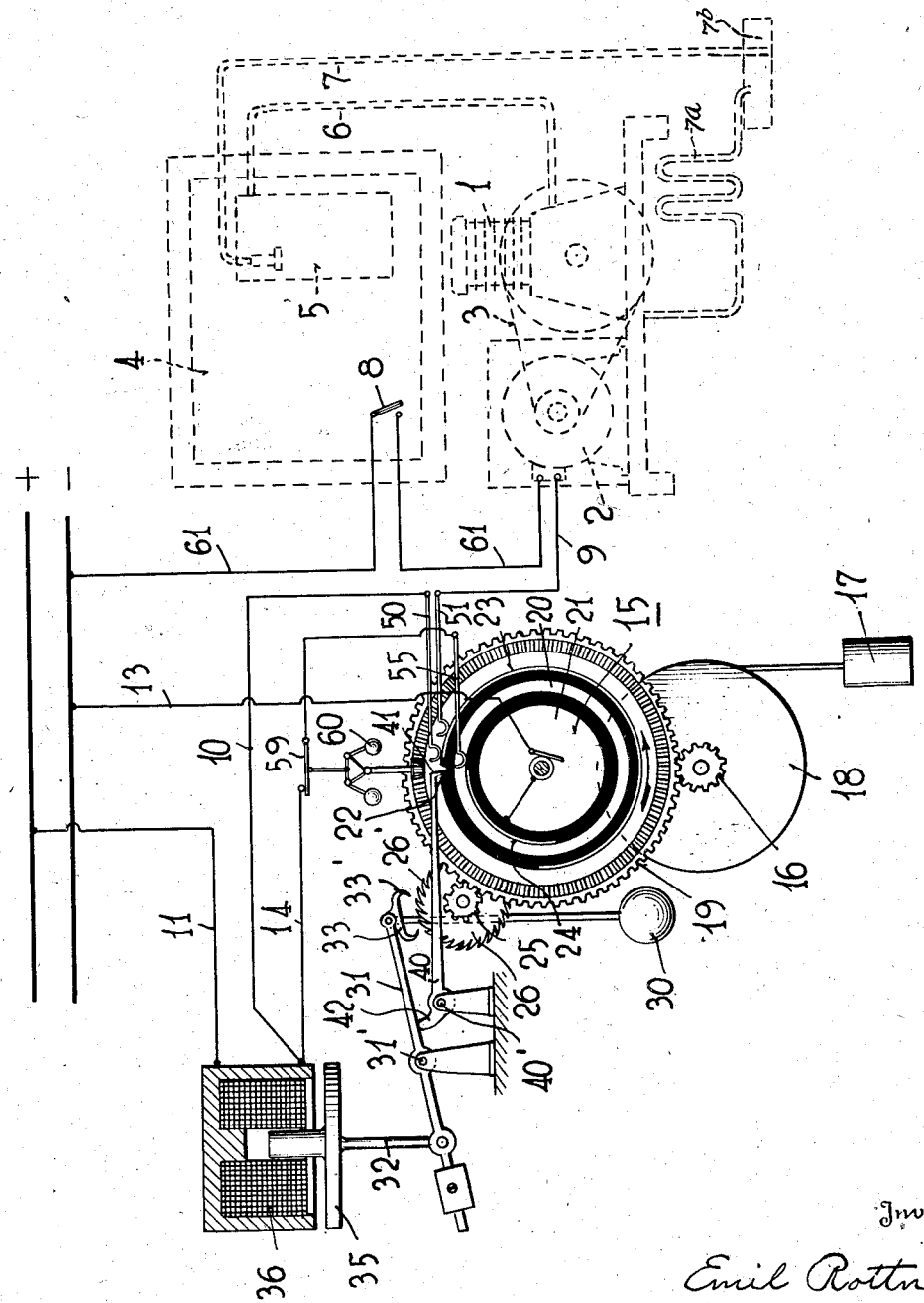
Inventor
Emil Rottner,
By Sommers & Young
Attorneys Patented Aug. 31, 1937

2,091,884

UNITED STATES PATENT OFFICE 2,091,884

METHOD AND APPARATUS FOR DEFROSTING REFRIGERATORS

Emil Rottner, Frankfort-on-the-Main, Germany

Application October 14, 1935, Serial No. 44,991
In Germany November 9, 1934

9 Claims. (Cl. 62—4)

This invention relates to defrosting systems for refrigeration plants. The invention is particularly applicable to refrigeration plants which are periodically operative and non-operative according to the condition of coldness of some element or position whose temperature is affected by the vaporizer or expander. The ordinary non-operative periods are for the purpose of preventing the temperature from becoming lower than desired, but do not permit the temperature to rise sufficiently for defrosting. For defrosting the expander there have been provided various systems all of which provide for non-operative periods of longer duration than the ordinary non-operative periods.

Various defects are apparent in the known defrosting devices or systems for refrigerating plants, caused chiefly by unreliable operation and dependency on personnel. Either switches were provided which have to be manually actuated by the operator of the plant, or, if automatic devices were provided, they are ordinarily not actuated according to the actual condition of the expander, but provide a long inoperative period at regular intervals of time in order to give the ice opportunity to melt off of the expander, regardless of whether or not any had actually collected on its surface. Other defrosting devices are based on the use of a second thermostat, which is influenced by the temperature of the cooling element itself. Regulation and adjustment of such plants, however, can be performed only by skilled operators, and a slight shifting of the adjustment by an unskilled operator or through any other cause makes a visit and readjustment by an expert necessary.

It is an object of this invention to avoid the defects existing in previously known defrosting systems for refrigeration plants by providing a defrosting system which operates to defrost the plant only when necessary as determined from the efficiency of the cooling of the refrigerator.

A further object of this invention is to provide a defrosting system for refrigeration plants in which the plant is defrosted when necessary as determined by the duration of the ordinary operative periods thereof.

The advantage of the present invention as compared with previously known apparatus consists in that according to this invention the operation of the machine is automatically controlled in dependence on the actual condition of frosting of the vaporizer, and interruptions of the normal operative periods occur only when a long non-operative period is necessary. This is accomplished principally by the use of an automatic switch mechanism.

The invention is illustrated diagrammatically in the accompanying drawing. Reference numeral 1 refers to a refrigerant compressor driven by electric motor 2 by any conventional drive means such as the drive belt 3 illustrated. The refrigerator chamber 4 is cooled in the usual manner by a refrigerant expander or vaporizer 5, which is connected with the compressor 1 by the connecting lead conduit 7 through condenser 7a and receiver 7b, and by return conduit 6. The drive motor 2 is connected and disconnected with its source of electric power by an ordinary thermostatic switch 8 and the circuit also includes an automatic switch for controlling defrosting of the expander 5. One supply lead 9 to the motor 2 is connected in or disconnected from the source of electric current by this thermostatic switch 8. The other motor lead 10 passes to the current supply through the switch mechanism designated generally by numeral 15.

The purpose of this switch mechanism 15 is to interrupt a current lead to the drive motor 2 when the regular operative periods, resulting from local conditions, are prolonged beyond the predetermined normal period by the condition of frosting of the vaporizer 5. The switch mechanism 15 has a contact which, during normal operation, maintains the connection of the current lead within the normal operative period, and quickly returns to its original position each time the machine is disconnected by the thermostatic switch 8 within the time limit of an ordinary period of operation. If the normal operative period is prolonged as a result of the condition of the vaporizer, the contact disc, on termination of the maximum normal operative period, cuts off the current lead to the motor, so that the operation thereof ceases for a predetermined time period; whereby the vaporizer or expander is permitted to defrost. The non-operative period is likewise adjusted to the local conditions of the plant, and on its termination the contact disc again connects in the current with the motor of the refrigerating machine. In the meantime the ice layer will have thawed off the vaporizer, so that normal operation can be resumed.

The switch mechanism 15 comprises gears wheels 16, 19 and 25 and escape wheel 26 interengaging as indicated in the drawing and a mechanical or electric actuating device 17. As diagrammatically indicated the actuating device may be simply a weighted cord partly wound on a drum 18 on wheel 16. The speed of operation of the switch mechanism 15 is controlled by a pendulum 30 and associated escapement mechanism. The pendulum 30 is attached to one end of an intermedially pivoted lever 31, the other end of which is connected through rod 32 with the armature 35 of solenoid 36. When this solenoid 36 is energized by means of closing of thermostatic switch 8, lever 31 is locked about its pivot so that the pallets 33' of a speed controlling escapement lever 33, mounted on the same end of lever 31 as pendulum 30, contact with the teeth 26' of the escape wheel 26. Ordinarily, when the thermostatic switch 8 is cut out, the speed controlling lever 31 is released in non-operative position as shown on the drawing. The lever 31 is pivotally fastened to the housing of the defrosting device at point 31'. A second lever 40 is pivoted to the housing at point 40'. One end of this lever is provided with a hook 41 adapted to engage in a detent 22 in the periphery of the contact disc 20 on wheel 19. When the lever 31 is actuated by the solenoid 36 it presses downwardly on the upwardly curved end 42 of lever 40. This movement of lever 40 releases the hook 41 from detent 22 and wheel 19 is then free to make its counterclockwise rotation as indicated by the arrow under the influence of actuating device 17 acting through drum 18 and wheel 16.

The speed of rotation of wheel 19 is regulated by pendulum 30 and escapement mechanism 26, 33. The swinging motion of pendulum 30 is initiated by the rocking of lever 31 by the armature 35 of the solenoid.

The wheel 19 is provided with a pair of annular or disc-shaped contact extensions or drums 20 and 21. These drums are provided with electro-conduction contacts 23 and 24, respectively, insulated from their respective drums and wheel 19 in any well known manner such as by peripheral rings of insulating material in which the contacts are set.

The system is provided with a pair of sliding contact arms 50 and 51 touching the contact 23 and also a contact arm 55 touching contact 24. By this construction an electric circuit may flow, for instance, through motor 2, lead 9 through arm 51, through conductive section 23 of disc 20 to the arm 50 to lead 10, through solenoid 36 to lead 11.

An alternate circuit through solenoid 36 may be established through lead 13, contact arm 55, contact 24, lead 14, solenoid 36 and lead 11. Of course, this can be established only when drum 21 has turned at least three-quarters of a revolution in a counterclockwise direction.

The electric circuit from the sliding contact arm 55 to the solenoid 36 can be interrupted at point 59 by a centrifugal device 60 which is actuated by the wheel 19 in known manner, when the wheel is turning free of restraint of the escapement mechanism. The solenoid 36 in normal operation is connected to one phase of the electric supply current by the lead 11 and to the other through lead 61, thermostatic switch 8, the motor 2, lead 9, the sliding contact 51, conductor section 23, sliding contact 50, and lead 10. The drawing shows the defrosting device in non-operative position, that is, when the thermostatic switch 8 is in open position. When the thermostatic switch 8 closes, the solenoid 36 attracts its armature 35, rod 32, and one end of the lever 31 whereby the pallets 33' of speed controlling lever 33 come in contact with the teeth 26' of the escape wheel 26. At the same time the hook 41 of lever 40 is moved upwardly so that the gear wheel 19 begins to rotate at the speed limited by the pendulum 30 and the associated escapement mechanism 26, 33. The speed is preferably so determined that the wheel 19 and discs 20 and 21 make one revolution in four hours. However, also within this period of time, the apparatus operates in dependence on the thermostatic switch 8. That is to say, when the thermostatic switch 8 opens, for instance, within one hour, which means before the wheel 19 has made more than one-fourth of its revolution, the disc 20 quickly continues automatically to its original position where it is stopped and held by engagement of hook 41 in detent 22. This is so arranged that the speed controlling device 33 takes the "release position" as shown on the drawing, permitting escape wheel 26 to move freely. The speed of this movement of wheel 19 actuates the centrifugal device 60 which thus interrupts the connection 14 at point 59 so that the sliding contact 55 when touching the section 24 is ineffective to establish the circuit through solenoid 36.

However, when the thermostatic switch 8 puts the refrigerator mechanism into operation again and a thermostatically controlled cut-off does not occur, say, within three hours, then it is to be supposed that this long period of operation of the cooling plant is due to the existence of frost on the expander, and it is in such case that the defrosting contact 24 on disc 21 establishes the circuit through solenoid 36 and the escapement mechanism remains in operation whereby the wheel 19 slowly completes its rotation and maintains the circuit of the refrigerating unit open so that the plant is put out of operation for the rest of the rotation of the wheel 19, this being, for instance, for one hour. In this case, of course, the centrifugal device remains out of operation since the speed of the disc is controlled and consequently slow. The device can, of course, also operate within other periods of time, but the time periods given above have proven to be well suited for practical service.

The ratios of the lengths of contacts 23 and 24 to the entire circumference of the drums 20 and 21 may be adjustable, so that the switch mechanism can be regulated according to local conditions of the cooling plant. If there are normal operative periods of more than three hours, for example, sliding contact can be prolonged by means of any kind of adjusting device. Influence can also be exerted on the operative periods of the clockwork which actuates the contact disc. The clockwork can be wound by hand without influencing the otherwise automatic operation of the apparatus, although it may also be provided with a completely automatic winding device. The plant may also be constructed with a plurality of refrigerating chambers.

It is thus clear that according to this invention electric circuits and control mechanism for refrigerators are provided that are entirely automatic, reliable and dependable in operation, and which require no regular operation or control by personnel and which will not require frequent adjustment. The system operates in dependence upon the actual condition of the vaporizer or expander as determined by the duration of normal operating periods, and, therefore, eliminates unnecessary defrosting periods while providing for defrosting whenever really desirable.

What I claim is:

1. Method of automatically defrosting electrically driven refrigeration plants having alternate operative and non-operative periods depending upon the temperature of an element influenced by the vaporizer of the plant, comprising measuring the duration of each operative period, and rendering the plant non-operative for a defrosting period of predetermined extent whenever the duration of an operative period exceeds a predetermined maximum.

2. Apparatus for controlling the operation of electrically operated refrigeration plants comprising an operating electric circuit, a switch in said circuit, temperature control means for opening and closing said switch in accordance with the temperature of a refrigerated point in said plant, means for timing an operating period of the plant, and means for opening said circuit and rendering said plant non-operative for a defrosting period if the operating period exceeds a predetermined maximum period.

3. Apparatus for automatically defrosting electrically operated refrigeration plants comprising an operating electric circuit, a switch in said circuit, temperature control means for opening and closing said switch in accordance with the temperature of a refrigerated point in said plant, means for timing a closed period of the operating electrical circuit, means for breaking said circuit after a predetermined period of operation, means for maintaining said circuit broken for a defrosting period and means for closing said circuit after the defrosting period.

4. Apparatus for automatically defrosting refrigeration plants having a refrigeration chamber, a refrigerant expander and a thermostatic device influenced by the temperature of said chamber for rendering the expander periodically operative and non-operative according to the temperature of said chamber, comprising means for measuring the duration of an operative period of the expander, means for interrupting operation of the expander if said period exceeds a predetermined duration, means for measuring the duration of said interruption of operation, and means for restarting operation of the expander after a predetermined period of interruption sufficient for defrosting the expander.

5. An electrically driven refrigeration plant comprising a refrigeration chamber, a gas compressor, a gas expander, a source of electric power, an electric motor for driving said compressor, an electric circuit from said source of power including said motor, thermostatically controlled means influenced by the expander for opening and closing said circuit, and means for breaking said circuit to defrost the expander whenever said thermostatically controlled means retains the circuit closed for a period of predetermined duration.

6. An electrically driven refrigeration plant comprising an electric motor, an electric circuit connected with said motor, a thermostatically controlled switch for controlling said circuit in accordance with the temperature of a part of the plant, a contact disk, means for turning said disk, releasable means for holding said disk at starting position, means for controlling the speed of turning of said disk, means for connecting and disconnecting elements of said speed controlling means, a solenoid having an armature connected with the connecting and disconnecting means of said speed controlling means and with the disk holding means, said solenoid being connected in the motor circuit whereby when the thermostatically controlled switch closes the solenoid is energized and the disk is permitted to turn while said elements of the speed controlling means are connected together whereby the contact disk is turned at a controlled rate.

7. An electrically driven refrigeration plant comprising an electric motor, an electric circuit connected with said motor, a thermostatically controlled switch for controlling said circuit in accordance with the temperature of a part of the plant, a movable contact of limited extent, a pair of spaced contact arms engaging said movable contact, said arms being connected in said circuit, means for moving said contact, releasable means for holding said contact at starting position, means for controlling the rate of movement of said contact, said rate controlling means having an element movably mounted to be engaged with and disengaged from another element to render the rate controlling means operative and nonoperative, means controlled by the motor circuit for releasing the contact holding means to permit movement thereof, and means controlled by said circuit for moving said elements of said rate controlling means into and out of engagement.

8. An electrically driven refrigeration plant comprising an electric motor, an electric circuit connected with said motor, a thermostatically controlled switch for controlling said circuit in accordance with the temperature of a part of the plant, a movable contact of limited extent, a pair of spaced contact arms engaging said movable contact, said arms being connected in said circuit, means for moving said contact, releasable means for holding said contact at starting position, means for controlling the rate of movement of said contact, said rate controlling means having an element movably mounted to be engaged with and disengaged from another element to render the rate controlling means operative and non-operative, means controlled by the motor circuit for releasing the contact holding means to permit movement thereof, means controlled by said circuit for moving said elements of said rate controlling means into and out of engagement, a second contact mounted to be movable with the first-mentioned contact, a contact arm to engage said second contact, said contacts and contact arms being positioned relative to each other to establish contact between the second contact and its contact arm substantially at the time of interruption of contact between the first contact and its contact arms, said second contact and its contact arm being connected in a second circuit including the means for moving the elements of the rate controlling means into and out of engagement.

9. An electrically driven refrigeration plant comprising an electric motor, an electric circuit connected with said motor, a thermostatically controlled switch for controlling said circuit in accordance with the temperature of a part of the plant, a contact disk having an electro-conductive contact extending partially therearound, a second contact disk having an electro-conductive contact extending partially therearound, a pair of contact arms for engaging the first contact, a contact arm for engaging the second contact, the first contact and its pair of contact arms being connected in the circuit connected with the motor, a second electric circuit including the second contact and its contact arm and excluding the motor, the contacts and their contact arms being so positioned relative to each other that when said disks are turned the second contact is engaged by its contact arm substantially at the time of interruption of contact between the first contact and one of its contact arms, means for turning said disks, releasable means for holding said disks at starting position, means for controlling the speed of turning of said disk, means for connecting and disconnecting elements of said speed controlling means, a solenoid having an armature connected with the connecting and disconnecting means of said speed controlling means and with the disk holding means, said solenoid being connected in both circuits, a centrifugal switch mechanism controlled by the speed of turning of said contact disks for opening the second circuit when the speed of turning of said disks exceeds a predetermined maximum, whereby when the thermostatically controlled switch opens before the second circuit has been completed the solenoid is deenergized and the said elements of the speed controlling means are disengaged, the disks being then free to rotate at a fast speed, and the centrifugal switch being operated to open the second circuit, the disks being stopped at starting position by the said holding means.

EMIL ROTTNER.